United States Patent Office 3,153,057
Patented Oct. 13, 1964

3,153,057
GUANIDINO DERIVATIVES OF COUMARAN
AND INDANE
Michael William Baines, Roy Fielden, and Wasyl Tertiuk,
Welwyn Garden City, England, assignors to Smith
Kline & French Laboratories, Philadelphia, Pa., a corporation of Pennsylvania
No Drawing. Filed Oct. 10, 1962, Ser. No. 229,754
Claims priority, application Great Britain Oct. 18, 1961
5 Claims. (Cl. 260—346.2)

This invention relates to new compounds having chemotherapeutic activity and is concerned with novel pharmaceutically acceptable acid addition salts of guanidine derivatives of coumaran and indane having antihypertensive activity due to their specific adrenergic nerve blocking activity.

The compounds of the invention are the pharmaceutically acceptable acid addition salts of the unstable free bases represented by the following structural formula:

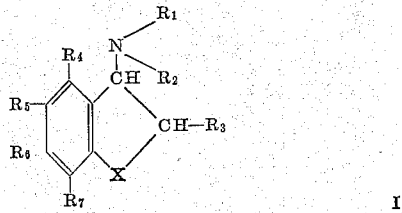

wherein $R_1$ is hydrogen or a straight- or branched-chain lower alkyl group; $R_2$ is

$R_3$ is hydrogen or a straight- or branched-chain lower alkyl group; $R_4$, $R_5$, $R_6$ and $R_7$, which may be the same or different, are each hydrogen, halogen, nitro, lower alkoxy or lower carbalkoxy; and X is O or $CH_2$, the values of $R_1$, $R_3$ $R_4$–$R_7$ and X being chosen so that when X is oxygen, at least one of $R_1$, $R_3$ and $R_4$–$R_7$ has a value other than hydrogen.

The term "lower" used through the specification in conjunction with a group name is used as means that there are from 1 to 5 carbon atoms in said group.

It will be observed that the compounds of Formula I possess a centre of asymmetry at the 3-carbon atom, so that the compounds can exist as $d$ and $l$ optical isomers. When $R_3$ in Formula I is not hydrogen, the compounds possess a second centre of asymmetry at the 2-carbon atom and may therefore also exist in the threo and erythro forms. It will be appreciated that the acid addition salts of the optical isomers, racemates and threo and erythro forms of the compounds of Formula I are all included within the scope of the present invention.

Particularly active adrenergic nerve blocking compounds are the pharmaceutically acceptable acid addition salts of the free bases represented by Formula I in which $R_1$ is hydrogen, $R_3$ is hydrogen, X is oxygen and at least one of $R_4$–$R_7$ is halogen.

Particularly preferred compounds as having very marked pharmacological activity are the pharmaceutically acceptable acid addition salts of 3-guanidino-5-chlorocoumaran.

The pharmaceutically acceptable acid addition salts of the bases of Formula I may be formed with any pharmacologically inert anion providing the resulting salt is stable. Examples of suitable anions are chloride, bromide, iodide, sulphate, perchlorate, nitrate, phosphate, or an organic acid anion such as a benzene sulphonate or toluene sulphonate anion.

The salts of the guanidine derivatives of Formula I may be prepared by employing any of the suitable generally known methods for preparing guanidine derivatives. Thus, for example, the compounds can be prepared by reacting the corresponding amine salt with cyanamide and a solvent, for example water, or by reacting the corresponding free amine with an isothiouronium salt, for example S-methylisothiouronium sulphate. The guanidine derivatives may also be prepared by reacting the corresponding amine with dicyandiamide, an O-alkylisourea, or thiourea in the presence of a desulphurising agent such as, for example, lead monoxide or iodine.

Another method which may be employed in some cases is the direct interaction of guanidine with the appropriate 3-halogeno-coumaran or -indane derivative. For example, 1-indanylguanidine may be prepared by the reaction of 1-chloroindane with guanidine.

As previously mentioned, the free bases of Formula I are unstable and hence the reaction product will be obtained in the form of an acid addition salt of the free base. The salt obtained may, if desired, be converted into a, or another, pharmaceutically acceptable salt of the free base in a suitable known manner, e.g. by treatment of the guanidine salt with a bicarbonate, e.g. potassium bicarbonate, to form the bicarbonate salt of the guanidine compound, which can then be treated with an appropriate acid, e.g. nitric acid, to form the desired pharmaceutically acceptable salt.

The amine congeners of the compounds of Formula I are either known to the art or, if not known, are easily prepared from the primary amines by standard reductive alkylation or halide alkylation procedures. The primary amines are prepared by reduction of the coumaran-3-oximes which are known or are in turn prepared by reacting the known coumaran-3-ones with hydroxylamine. The various coumaran-3-ones are either known to the art or are prepared by methods disclosed in Elderfield's "Heterocyclic Compounds," volume 2, pp. 1–67, (1951).

The amines are alternatively prepared by reducing known 3-nitrobenzofurans with a metal hydride reducing agent such as lithium aluminium hydride or by reductive amination of the coumaran-3-one using ammonia or an alkylamine in the presence of a reducing agent.

As mentioned above, the compounds of this invention have been found to be potent adrenergic nerve blocking agents when administered to the animal organism.

It will be appreciated that the pharmacologically active salts of the invention can be made up by well known pharmaceutical techniques into compositions in which said salts are the essential active ingredient. The compositions will generally contain in association with the active ingredient one or more pharmaceutical diluents and/or excipients therefor. Advantageously the compositions can be made up in a dosage unit form adapted for the desired mode of administration, the amount of active ingredient in each dosage unit being such that one or more units are required for each therapeutic administration. The dosage unit may be in liquid or solid form, for example, in the form of a solution, suspension, emulsion, packaged powder, encapsulated powder, tablet or lozenge. The composition will normally be administered orally so that the preferred compositions will be in a dosage unit form suitable for oral administration. However, the composition may be in a form suitable for parenteral administration, such as for example a sterial solution or suspension in water or other suitable liquid.

Examples of solid diluents which may be employed in the pharmaceutical compositions are lactose, sucrose, terra alba and starch. Examples of suitable liquid diluents are mineral or vegetable oils such as peanut oil, olive oil and sesame oil, alcohols, glycerol or other glycols, and water.

Examples of excipients which may be employed in the solid dosage unit forms of the pharmaceutical compositions are adhesives such as acacia, gelatin, starch and polyvinylpyrrolidone, disintegrating agents such as α-cellulose and magnesium aluminium silicate, and lubricants such as magnesium stearate, stearic acid and talcum.

Examples of excipient which may be employed in the liquid dosage unit forms for oral administration are sweeteners such as glucose, sorbitol and saccharin, buffering agents such as citric acid, tartaric acid, phosphoric acid and the sodium or potassium salts of said acids, thickeners or emulsifying agents such as acacia, tragacanth, pectin and cellulose derivatives, and preservatives such as benzoic acid and parahydroxybenzoic acid.

Examples of excipients which may be employed in the liquid dosage unit forms for parenteral administration are buffering agents such as those previously mentioned, bactericides or bacteriostatics such as phenol, cresol, chlorbutol, chlorocresol and benzyl alcohol, and antioxidants such as sodium sulphite, sodium metabisulphite and ascorbic acid.

The following examples illustrate the invention.

Example 1

5-chlorocoumaran-3-one oxime (173 g.) dissolved in alcohol (2000 ml.) was stirred at 60–65° C. Sodium amalgam (10%; 1700 g.) and glacial acetic acid (600 ml.) in alcohol (600 ml.) were added over three hours, the temperature remaining at 60–65° C. The thick suspension was stirred for two hours more. Ice and hydrochloric acid (6 N; 1400 ml.) were added to the cooled mixture, the mercury was separated and the acidic aqueous layer evaporated at reduced pressure to about 3 litres. The concentrated solution was extracted with ether, some amine hydrochloride being precipitated, and then strongly basified with 50% aqueous sodium hydroxide. The resulting 3-amino-5-chlorocoumaran (90.7 g.) was isolated by ether extraction and distillation at 98–101° C./0.4 mm.

3-amino-5-chlorocoumaran hydrochloride (7.7 g.) crystallised from 6 N hydrochloric acid, cyanamide (6.7 g.) and water (40 ml.) were stirred under reflux for 24 hours. After allowing to stand at 0° C. for several hours the solid was filtered off and washed with a little ice-cold water. Potassium bicarbonate (4.1 g.) was added to the warm filtrate and washings. The resulting precipitate was collected, dissolved in boiling water (125 ml.) and treated with nitric acid (8 N; 5 ml.). The desired 3-guanidine-5-chlorocoumaran nitrate crystallised on cooling. When recrystallised from hot water, the resulting needles and plates had a M.P. of 237–238.5° C. (decomp.).

Example 2

1-indanylamine hydrochloride (1.00 g.) and cyanamide (1.02 g.) in water (6 ml.) were heated under reflux for 24 hours. After cooling at 0° C. for several hours, the solid which formed was filtered off and washed with ice-cold water, and the combined filtrates were warmed and treated with potassium bicarbonate (0.60 g.). The resulting solid was collected, suspended in hot water (4 ml.) and carefully acidified with concentrated nitric acid (0.5 ml.). The 1-indanylguanidine nitrate which crystallised on cooling was recrystallised from hot water as colourless prisms (1.0 g.), M.P. 145–147° C.

Using synthetic methods as described in detail in the foregoing specific examples:

5:7-dichlorocoumaran-3-one oxime was converted into 3-guanidino-5:7-dichlorocoumaran chloride;

7-chlorocoumaran-3-one oxime was converted into 3-guanidino-7-chlorocoumaran sulphate.

Example 3

Tablets were prepared by granulating and compressing the following ingredients in accordance with known pharmaceutical techniques.

| Ingredient: | Mg. per tablet |
|---|---|
| 3-guanidino-5-chlorocoumaran nitrate | 50.0 |
| Terra alba | 70.0 |
| Sucrose | 6.0 |
| Starch | 16.0 |
| Gelatin | 1.5 |
| Talcum | 2.0 |
| Stearic acid | 3.0 |

If desired, the tablets may be coated and/or scored so that, for example, quarter or half the dosage may be administered.

It will be appreciated that other acid addition salts of pharmacologically active guanidine derivatives falling within the definition of Formula I may be used in formulating the above-described tablets provided that they have the necessary activity.

What is claimed is:

1. A pharmaceutically acceptable acid addition salt of a base of the formula:

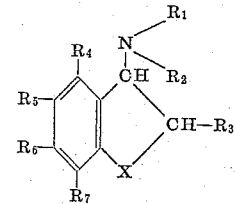

in which:

$R_1$ is a member selected from the group consisting of hydrogen, straight- and branched-chain lower alkyl;

$R_2$ is

$R_3$ is a member selected from the group consisting of sraight- and branched-chain lower alkyl;

$R_4$, $R_5$, $R_6$ and $R_7$ are each a member selected from the group consisting of hydrogen, halogen, nitro, lower alkoxy and lower carbalkoxy; and X is a member selected from the group consisting of O and $CH_2$, at least one of $R_1$, $R_3$ and $R_4$–$R_7$ being a member other than hydrogen when X is O.

2. 3-guanidino-5-chlorocoumaran nitrate.
3. 3-guanidino-5, 7-dichlorocoumaran hydrochloride.
4. 1-indanylguanidine nitrate.
5. 3-guanidino-7-chlorocoumaran sulfate.

No references cited.